United States Patent Office 3,572,415
Patented Mar. 23, 1971

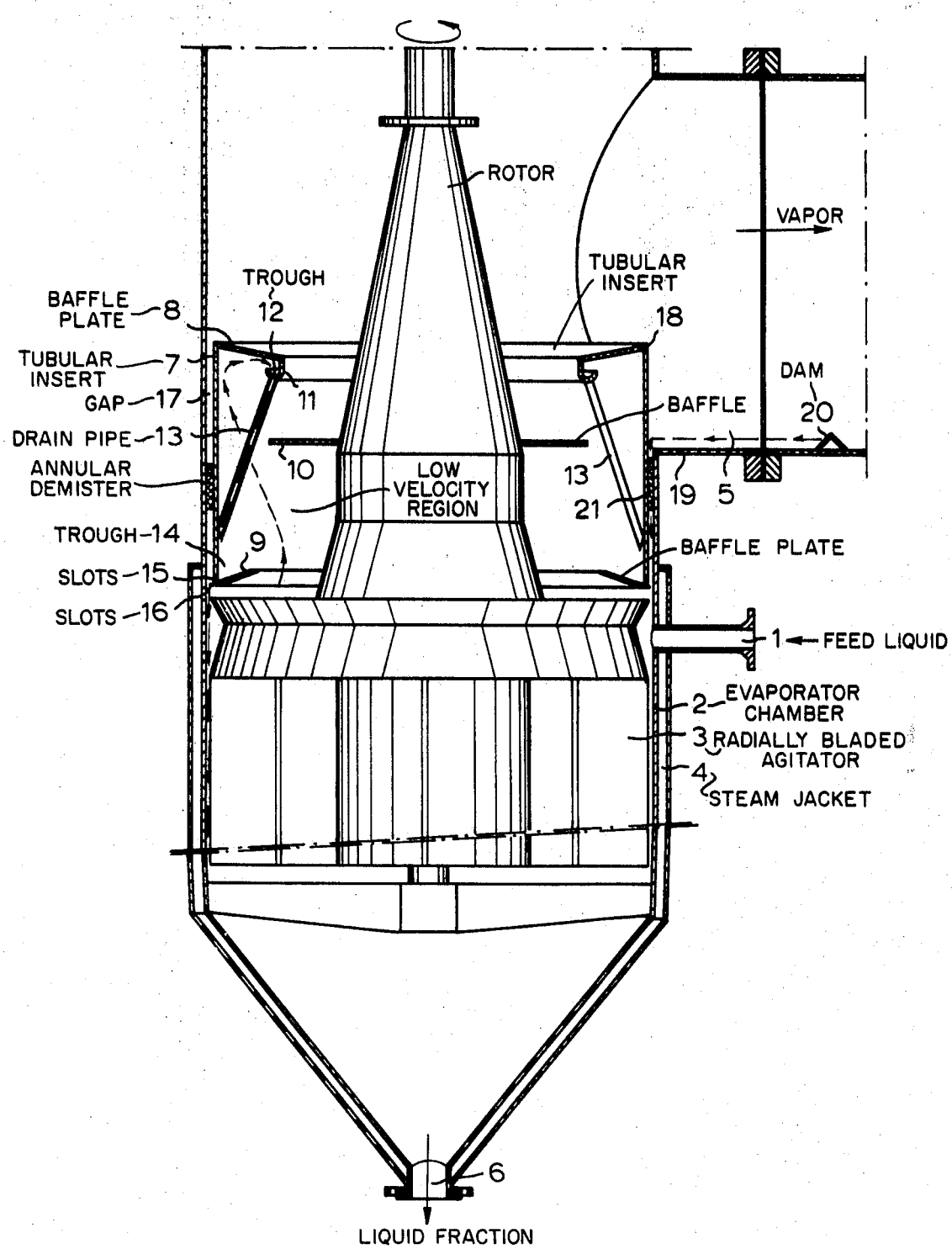

3,572,415
INSTALLATION FOR TREATING LIQUIDS
Gerard L. M. Voncken, Munstergeleen, Netherlands, assignor to Stamicarbon N.V., Heerlen, Netherlands
Filed Jan. 13, 1969, Ser. No. 790,636
Claims priority, application Netherlands, Jan. 11, 1968, 6800384, 6800385
Int. Cl. B01d 1/22
U.S. Cl. 159—6                                    6 Claims

ABSTRACT OF THE DISCLOSURE

A film evaporator is disclosed in which at least the topmost of the baffles for separating entrained liquid particles from the vapor discharge is provided with a guide surface leading to a trough. Drain pipes leading obliquely downwardly from the trough convey the collected liquid to an area of sufficiently low gas velocity as to allow the liquid to flow to the condensate discharge port. Some of the baffles are located on a concentric insert having an upper end located above the base of the vapor discharge line. As a further measure, a dam is then provided in the base of the vapor discharge line.

BACKGROUND OF THE INVENTION

The invention relates to an apparatus for evaporating liquid. Evaporating apparatus are known which comprise a substantially vertically disposed cylindrical chamber having a vapour discharge line at the top, a concentrate discharge port at the bottom and an intermediately disposed liquid feed line. The lower part of the chamber is provided with a heating jacket and the upper part, which is preferably unheated, is provided with one or more wall-mounted baffle plates, for intercepting liquid particles entrained by the vapour. A rotor or agitator is mounted for rotation around the central axis of the chamber for distributing the liquid fed into the chamber in a thin layer over the inside of the peripheral wall of the chamber.

Such an apparatus, which in industrial practice is known as a film evaporator, is used for example for evaporating, concentrating and distilling liquids which can be allowed to be exposed to elevated temperatures for only a short time, as the taste, the chemical composition or some other property would otherwise be impaired. To increase the evaporation rate and lower the evaporation temperature, the pressure in the chamber is normally kept below atmospheric pressure during operation. Particularly in those cicumstances the gas velocity in the evaporator may be so high that liquid drops which, by virtue of their composition, belong in the bottom fraction, become entrained and carried away with the vapour. If the objective is to prepare a concentrated solution by evaporating solvent, this entrainment involves loss of an amount of valuable constituent or constituents from the concentrate, whereas if the objective is to free a liquid of a constituent or constituents with a boiling point above a given level, the liquid obtained by condensation of the discharge vapour will be contaminated with entrained liquid particles of liquid which properly belongs to the unwanted fraction.

Baffle plates can be provided in the upper part of the chamber so as to change the direction of the vapour flow and cause entrained liquid particles to deposit on such baffle plates and the wall of the chamber. Such deposited liquid can flow down under gravity and have a further opportunity to become discharged from the bottom of the chamber, but the baffle plates do not in themselves prevent entrainment of an appreciable quantity of liquid by the vapour flow because some of the deposited liquid droplets become entrained off the baffle plates, against gravity, by the vapour discharge currents.

SUMMARY OF THE INVENTION

The invention aims at obviating the above drawback and provides an apparatus in which the entrained liquid drops are effectively separated off and carried back into the evaporator part of the apparatus.

This has been achieved in that according to the invention channel means are provided to collect the separated liquid particles deposited on the baffle plates and to return the thus collected liquid to the evaporator part of the apparatus. To this end, at least the topmost baffle plate is provided on its radially inner edge with a downwardly extending cylindrical part, the lower edge of which is directed radially outwards forming a trough; at least one obliquely downwardly disposed drain pipe being connected at an upper inlet end to said trough and at a lower end debouching a short distance from the wall of the apparatus.

The separated liquid particles which, under the influence of the high gas velocity, are entrained along the inside of the walls of the apparatus in the direction of the vapour outlet, collect in the trough and descend, through the drain pipe or pipes to a lower part of the apparatus where the gas velocity is lower than in the region of the chamber where the gas flow path is more restricted due to the presence of the annular baffle plate. The liquid will accordingly get another opportunity to flow to the discharge port for the condensate.

The or each drain pipe is preferably placed with its discharge end over a lower baffle plate of truncated conical shape which is spaced from the wall of the apparatus by a narrow gap. The liquid returned through the drain pipe(s) is then delivered at a position where the upward gas velocity is low, so that the returned liquid can freely flow back through such gap into the evaporator section.

The baffle plate(s) may further be mounted on the inside of a tubular insert which is in turn diposed concentrically in the upper part of the cylindrical chamber and spaced from the inner wall of the chamber by a narrow annular gap. Liquid particles which, under the influence of the high gas velocity, flow along the baffle plates towards the vapour discharge line, must now pass the annular gap, where their velocity is slowed down so much that they will coalesce to form bigger drops. As the gas velocity in the annular gap is low, said bigger drops will rapidly gravitate through the gap and return to the evaporator section.

It has been found that the reflux of the liquid is promoted if the tubular insert is disposed with its upper edge above the base of the vapour discharge line. The vapour discharge conduit may advantageously be provided with an internal dam or barrier wall extending laterally across the bottom of such discharge conduit at some distance from its junction with the evaporating chamber. Liquid entrained into such conduit will tend to deposit on the bottom of the conduit and the barrier wall will prevent it from being drawn further along the conduit so that the liquid can flow back through the annular gap to the evaporator compartment.

Preferably a resistance, such as a labyrinth or a ring of demister gauze, is fitted in the annular gap between the cylindrical chamber and the insert. Such resistance will restrict the amount of gas ascending through the gap but will not prevent the descent of liquid.

BRIEF DESCRIPTION OF THE DRAWING

The invention will be further elucidated with reference to the embodiment illustrated by way of example in the accompanying drawing, which is a half sectional elevation of a film evaporator.

DESCRIPTION OF THE PREFERRED EMBODIMENT

The liquid to be treated is supplied via a conduit 1 to a vertically disposed tubular evaporator chamber 2. Mounted in the chamber is an agitator 3, with radially disposed blades, which is actuated by a drive (not shown) mounted on the evaporator. Liquid fed to the evaporator is flung against the periphery of the chamber by the action of the blades, and then flows down as a thin layer along the peripheral wall. The lower portion of the chamber is formed with a steam jacket 4, with the result that the fraction which, at the pressure prevailing in the installation, has its boiling point below the wall temperature, will evaporate rapidly. The vapour is drawn off through a lateral discharge conduit 5 connected to the top of the apparatus. The fraction which, at the pressure prevailing in the apparatus, has its boiling point above the wall temperature, is carried off through a bottom outlet 6.

Since, especially when the evaporation is effected in vacuo, the gas velocity is fairly high, droplets of liquid belonging to the fraction which should discharge through the bottom outlet 6 may be entrained by the vapour. To separate these liquid particles from the vapour and enable them to flow back to the evaporating part of the apparatus, a tubular insert 7 is fitted in the non-heated upper part of the apparatus, the said insert being provided with an upper annular baffle plate 8 and with a lower conical baffle plate 9. Between the plates 8 and 9, a baffle plate 10 is mounted on the agitator shaft, so that vapour flowing axially through the apparatus is compelled to change its direction of flow a few times. The entrained liquid particles are thus flung against the inner wall of the tubular insert.

The inner margin of the baffle plate 8 is bent to provide a downwardly extending part 11 and an underlying trough 12. Liquid ascending along the inner wall of the tubular insert and along the underside of baffle plate 8 is collected in said trough and flows down through a number of drain pipes 13. The drain pipes 13 debouch at so short a distance from the inner wall of tubular insert 7 that liquid issuing from the pipes will immediately contact said wall and, subsequently, drip down in the low-velocity flow region above plate 9. The liquid collects in the trough 14 formed between the conical plate 9 and the tubular insert and flows away through slots 15 and 16 which are respectively formed between the plate and the tubular insert, and between the plate and the wall 2, into the evaporator compartment.

The tubular insert is concentrically disposed in the evaporator compartment in such a position that an annular gap 17 is left between said tubular insert and the wall of the apparatus. Liquid particles travelling along the upper surface of baffle plate 8 towards the vapour discharge line 5 will have to pass across said gap. Owing to the low upward gas velocity through the gap, this liquid will descend through this gap. The upper edge 18 of the tubular insert reaches above the lower wall 19 of the discharge line, so that behind said edge there will be a region in which the gas velocity is low.

Within the vapour discharge conduit 5 there is a dam 20, which, in combination with the part of the tubular insert which extends above the level of the bottom of this conduit, constitutes a reservoir in which liquid which might pass across the gap can accumulate, to be subsequently drained off through the gap.

Gap 17 contains a resistance, for example a ring of demister gauze 21. This gauze is sufficiently permeable to the liquid, but offers so much resistance to the flow of gas that this will flow primarily through the space between the baffle plates. Liquid gravitating along the gap flow back into the evaporator section together with liquid draining through slot 15.

What is claimed is:

1. Apparatus for treating liquids, comprising a substantially vertically disposed tubular body provided with a vapor discharge line at the top, a concentrate discharge port at the bottom and an intermediately disposed liquid feed line, the lower part of said body constituting an evaporator part of the apparatus and being provided with heating means for evaporating liquid fed to said apparatus through said feed line, the upper part of said body being provided with at least one baffle plate for separating liquid particles entrained by the vapor from the vapor, and an agitator adapted to rotate within the tubular body for distributing the liquid to be treated in a thin layer over the wall of the tubular body, characterized in that channel means are provided to collect the separated liquid particles deposited on the at least one baffle plate and to return the thus collected liquid to the evaporator part of the apparatus; at least the top-most baffle plate being provided on its radially inner edge with a downwardly extending cylindrical part, the lower edge of which being directed radially outwards forming a trough; at least one obliquely downwardly disposed drain pipe connected at an upper, inlet end to said trough and at a lower end debouching a short distance from the wall of the apparatus; a lower one of said baffle plates having the shape of an upright truncated cone and being spaced from the wall of the apparatus by a narrow gap, said at least one drain pipe debouching over said lower one of said baffle plates.

2. Apparatus for treating liquids, comprising a substantially vertically disposed tubular body provided with a vapor discharge line at the top, a concentrate discharge port at the bottom and an intermediately disposed liquid feed line, the lower part of said body constituting an evaporator part of the apparatus and being provided with heating means for evaporating liquid fed to said apparatus through said feed line, the upper part of said body being provided with at least one baffle plate for separating liquid particles entrained by the vapor from the vapor, and an agitator adapted to rotate within the tubular body for distributing the liquid to be treated in a thin layer over the wall of the tubular body, characterized in that channel means are provided to collect the separated liquid particles deposited on the at least one baffle plate and to return the thus collected liquid to the evaporator part of the apparatus; at least one baffle plate being mounted on the inside of the tubular insert, the tubular insert in turn being disposed concentrically in the upper part of the tubular body and spaced from the wall of the tubular body by a narrow annular gap.

3. Apparatus according to claim 2, characterized in that the upper edge of the tubular insert extends above the base of the vapor discharge line.

4. Apparatus according to claim 3, characterized in that the base of the vapor discharge line is provided with a dam spaced from the tubular insert.

5. Apparatus according to claim 2, characterized in that a gas-flow resistance means is fitted in the annular gap between the tubular insert and the inner wall of the tubular body.

6. Apparatus according to claim 5, characterized in that said gas-flow resistance means comprises a ring of demister gauze.

(References on following page)

References Cited

UNITED STATES PATENTS

| | | | |
|---|---|---|---|
| 1,168,758 | 1/1916 | Stade | 159—27 |
| 1,853,739 | 4/1932 | Montgomery | 159—31 |
| 2,015,680 | 10/1935 | Kermer | 159—31 |
| 2,538,113 | 1/1951 | Mair | 159—43 |
| 2,842,195 | 7/1958 | Eckstrom et al. | 159—31 |
| 2,868,279 | 1/1959 | Brechtler | 159—6W |
| 2,974,725 | 3/1961 | Samesreuther | 159—6W |
| 3,082,815 | 3/1963 | Keller | 159—6W |

SAMIH N. ZAHARNA, Primary Examiner

J. SOFER, Assistant Examiner

U.S. Cl. X.R.

202—236; 203—189